(12) United States Patent
Thekkath et al.

(10) Patent No.: US 7,721,073 B2
(45) Date of Patent: *May 18, 2010

(54) CONDITIONAL BRANCH EXECUTION IN A PROCESSOR HAVING A DATA MOVER ENGINE THAT ASSOCIATES REGISTER ADDRESSES WITH MEMORY ADDRESSES

(75) Inventors: Radhika Thekkath, Palo Alto, CA (US); Georgi Zlatkov Beloev, Walnut Creek, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/336,923

(22) Filed: Jan. 23, 2006

(65) Prior Publication Data

US 2007/0174598 A1 Jul. 26, 2007

(51) Int. Cl.
*G06F 9/40* (2006.01)
(52) U.S. Cl. ..................................... 712/234
(58) Field of Classification Search ............... 712/217, 712/234
See application file for complete search history.

(56) References Cited

U.S. PATENT DOCUMENTS

| | | | | |
|---|---|---|---|---|
| 4,882,701 A | * | 11/1989 | Ishii | 712/241 |
| 5,109,520 A | | 4/1992 | Knierim | |
| 5,568,630 A | * | 10/1996 | Killian et al. | 712/200 |
| 5,881,257 A | * | 3/1999 | Glass et al. | 712/200 |
| 5,926,832 A | * | 7/1999 | Wing et al. | 711/141 |
| 6,067,601 A | | 5/2000 | Sollars | |
| 6,178,482 B1 | | 1/2001 | Sollars | |
| 6,308,263 B1 | * | 10/2001 | Hayakawa et al. | 712/230 |

(Continued)

FOREIGN PATENT DOCUMENTS

WO  WO 02/082278 A1  10/2002

OTHER PUBLICATIONS

Kiyohara et al. "Register connection: a new approach to adding registers into instruction set architectures" International Conference on Computer Architecture Proceedings of the 20th annual international symposium on Computer architectureSan Diego, California, United States pp. 247-256 Year of Publication: 1993.*

(Continued)

*Primary Examiner*—David J Huisman
*Assistant Examiner*—Keith Vicary
(74) *Attorney, Agent, or Firm*—Sterne, Kessler, Goldstein & Fox, PLLC.

(57) ABSTRACT

A RISC processor having a data moving engine and instructions that associate register addresses with memory addresses. In an embodiment, the instructions include a read-tie instruction, a single write-tie instruction, a dual write-tie instruction, and an untie instruction. The read-tie, single write-tie, and dual write-tie instructions are used to associate software accessible register addresses with memory addresses. These associations effect the operation of the data moving engine such that, for the duration of the associations, the data moving engine routes data to and from associated memory addresses and the execution unit of the processor in response to instructions that specify moving data to and from the associated register addresses. The invention reduces the number of instructions and hardware overhead associated with implementing program loops in a RISC processor.

26 Claims, 13 Drawing Sheets

U.S. PATENT DOCUMENTS

| | | |
|---|---|---|
| 7,032,226 B1 | 4/2006 | Nemirovsky et al. |
| 2007/0174594 A1 | 7/2007 | Thekkath |
| 2007/0174595 A1 | 7/2007 | Thekkath et al. |

OTHER PUBLICATIONS

Taylor, Michael "The Raw Prototype Design Document" Nov. 1999.*

"Instruction Set Architecture" C. Edward Chow; May 14, 1999; accessible at http://cs.uccs.edu/~cs520/S99ch2.PDF.*

Mikhail Smelyanskiy et al; "Register Queues: A New Hardware/Software Approach to Efficient Software Pipelining"; Proceedings of the 2000 International Conference on Parallel Architectures and Compilation Techniques; Year of Publication: 2000.*

FOLDOC (definition of Verilog); created on Apr. 16, 1999.*

Beyond3D et al. (Beyond) (Registers vs. Memory, what differs in the silicon level). Oct. 19, 2002.*

PA-RISC 2.0; 1995; first two pages and p. 7-27.*

Nemirovsky, M. et al., U.S. Appl. No. 09/602,279, filed Jun. 23, 2000, entitled "Methods and Apparatus for Background Memory Management".

Goodman, J.R. et al., "PIPE: A VLSI Decoupled Architecture," *ACM SIGARCH Computer Architecture News*, Jun. 1985, pp. 20-27, ACM Press, New York, NY.

Smith, J.E., "Retrospective: Decoupled Access/Execute Computer Architectures," *25 Years of the international Symposia on Computer Architecture (Selected Papers)*, Jun. 1998, pp. 27-28, ACM Press, New York, NY.

Smith, J.E. et al., "The ZS-1 Central Processor," *Proceedings of the Second Int'l Conference on Architectural Support for Programming Languages and Operating Systems*, 1987, pp. 199-204, IEEE Computer Society Press, Los Alamitos, CA.

Bird, P.L. et al., "The Effectiveness of Decoupling," *Proceedings of the 7th Int'l Conference on Supercomputing*, 1993, pp. 47-56, ACM Press, New York, NY.

Sung, M. et al., "Multithreading Decoupled Architectures for Complexity-Effective General Purpose Computing," *ACM SIGARCH Computer Architecture News vol. 29 - Issue 5*, Dec. 2001, pp. 56-61, ACM Press, New York, NY.

International Search Report and Written Opinion for PCT Patent Appl. No. PCT/US2007/001702, 19 pages, mailed Nov. 2, 2007.

Postiff, M. et al., "The Store-Load Address Table and Speculative Register Promotion," Proc. Of the 33rd Annual ACM/IEEE International Symposium on Microarchitecture, Monterey, CA, pp. 235-244 (Dec. 10, 2000).

Republished International Search Report for PCT Patent Appl. No. PCT/US/2007/001702, 9 pages, mailed Dec. 27, 2007.

Heath, Basics of Pipelining, Appendix a, 28 pages, 2003.

Office Communication, dated Jun. 20, 2007, for U.S. Appl. No. 11/336,937, filed Jan. 23, 2006, 25 pages.

Office Communication, dated Dec. 14, 2007, for U.S. Appl. No. 11/336,937, filed Jan. 23, 2006, 16 pages.

Office Communication, dated May 12, 2008, for U.S. Appl. No. 11/336,937, filed Jan. 23, 2006, 20 pages.

Office Communication, dated Feb. 17, 2009, for U.S. Appl. No. 11/336,937, filed Jan. 23, 2006, 24 pages.

Office Communication, dated May 26, 2009, for U.S. Appl. No. 11/336,937, filed Jan. 23, 2006, 31 pages.

Office Communication, dated Nov. 2, 2009, for U.S. Appl. No. 11/336,937, filed Jan. 23, 2006, 34 pages.

Office Communication, dated May 30, 2007, for U.S. Appl. No. 11/336,938, filed Jan. 23, 2006, 28 pages.

Office Communication, dated Jan. 16, 2008, for U.S. Appl. No. 11/336,938, filed Jan. 23, 2006, 18 pages.

Office Communication, dated Jul. 29, 2008, for U.S. Appl. No. 11/336,938, filed Jan. 23, 2006, 27 pages.

Office Communication, dated Apr. 10, 2009, for U.S. Appl. No. 11/336,938, filed Jan. 23, 2006, 32 pages.

Office Communication, dated May 22, 2009, for U.S. Appl. No. 11/336,938, filed Jan. 23, 2006, 33 pages.

Office Communication, dated Nov. 2, 2009, for U.S. Appl. No. 11/336,938, filed Jan. 23, 2006, 37 pages.

* cited by examiner

CONDITIONAL BRANCH EXECUTION IN A PROCESSOR HAVING A DATA MOVER ENGINE THAT ASSOCIATES REGISTER ADDRESSES WITH MEMORY ADDRESSES

CROSS REFERENCE TO RELATED APPLICATIONS

This application is related to commonly owned, co-pending U.S. application Ser. No. 11/336,937, filed on the same date herewith, entitled "Processor Having A Read-Tie Instruction And A Data Mover Engine That Associates Register Addresses With Memory Addresses," and commonly owned, co-pending U.S. application Ser. No. 11/336,938, filed on the same date herewith, entitled "Processor Having A Write-Tie Instruction And A Data Mover Engine That Associates Register Addresses With Memory Addresses," each of which is incorporated herein by reference in its entirety.

FIELD OF THE INVENTION

The present invention relates generally to processors and more particularly to processors that form associations between register addresses and memory addresses.

BACKGROUND OF THE INVENTION

Reduced Instruction Set Computer (RISC) processors are well known. RISC processors have instructions that facilitate the use of techniques such as pipelining, thereby improving processing performance.

Conventional RISC processors cannot operate on data stored in memory. Therefore, data to be operated upon by the processor must first be moved from memory into a register of the processor using a load instruction. Additionally, results calculated by the processor must be moved from a register back to memory using a store instruction. As a result, the load and store instructions of a conventional RISC processor can create significant overhead in certain types of programs, especially programs that perform looping routines. This overhead can also limit the speed at which a program operates. Furthermore, programs with looping routines need instructions to maintain and update a loop counter. This also results in additional overhead.

What is needed is a new RISC processor that overcomes the limitations noted above.

BRIEF SUMMARY OF THE INVENTION

The present invention provides a processor having a data moving engine and instructions that associate register addresses with memory addresses. In an embodiment, the instructions include a read-tie instruction, a single write-tie instruction, a dual write-tie instruction, and an untie instruction.

A read-tie instruction is used to associate a software accessible register address with a memory address, such as an input buffer address. This association effects the operation of the data moving engine such that, for the duration of the association, the data moving engine routes data from the associated memory address to an execution unit of the processor in response to instructions that specify the associated register address as a data source. Prior to associating the input buffer with the software accessible register, a memory transaction determines the number of elements to be accessed from an input buffer, the specific data width of each data transaction and the stride of each transaction. It is a feature of the read-tie instruction that its use reduces the need to include load instructions in program code. This is especially advantageous for applications in which the processor is used to implement time-sensitive digital signal processing loops.

A single write-tie instruction associates a register address with a memory address, such as an output buffer address, in the data moving engine such that, for the duration of the association between the register address and the memory address, the data moving engine routes data to the associated memory address when instructions attempt to write data to the associated register address. Prior to associating the output buffer with the software accessible register, a memory transaction determines the number of elements to be written to the output buffer, the specific data width of each data transaction and the stride of each transaction. This reduces the need to use store instructions to move data into a memory from a register, and it reduces, for example, the number of instructions required to implement a loop in program code as well as the amount of time needed to complete each iteration of the loop.

A dual write-tie instruction associates a register address with a memory address, such as an output buffer address, in the data moving engine such that, for the duration of the association between the register address and the memory address, the data moving engine writes data to the associated memory address and the associated register address when instructions attempt to write data only to the associated register address. This eliminates the need to write the result of a computation into a register and then use a store instruction to move the data into a memory address. In addition, the dual write-tie association between a register address and a memory address allows data to be read from the associated register without having to first disassociate the register address from the associated memory address and then load the data from the associated memory address into the register so it can be accessed.

An untie instruction disassociates a register address from a memory address, such as an input or output buffer address, so that the processor operates in a conventional fashion with respect to instructions that specify reading data from or writing data to the register.

In one embodiment, the data moving engine includes logic that is used to determine whether a conditional branch is taken or not taken in response to a branch instruction when a test register specified by the branch instruction is associated with a memory address, such as an input buffer address. This feature of the present invention is used, for example, to eliminate the need for maintaining a loop count variable in a general purpose register of the processor during execution of a program code loop and to eliminate instructions in the loop used to increment or decrement the loop count variable.

As described herein, other instructions can also be used to associate a software accessible register with a buffer. For example an association between a specific buffer and a specific software accessible register may be pre-programmed and stored in a register such as a co-processor register. An instruction that writes a specific value to the co-processor register activates the association between the buffer and the software accessible register. An instruction that writes another value to the co-processor register disassociates the buffer from the software accessible register. Instructions that write to a register to induce an association between a software accessible register and a buffer may be part of a standard instruction set and hence obviate the need for new instructions.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention is described with reference to the accompanying drawings. The drawing in which an element first appears is typically indicated by the leftmost digit in the corresponding reference number.

DETAILED DESCRIPTION OF THE INVENTION

The present invention provides a processor core that includes a data moving engine and instructions that allow a programmer to associate one or more register addresses with memory addresses, such as input or output buffer addresses. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
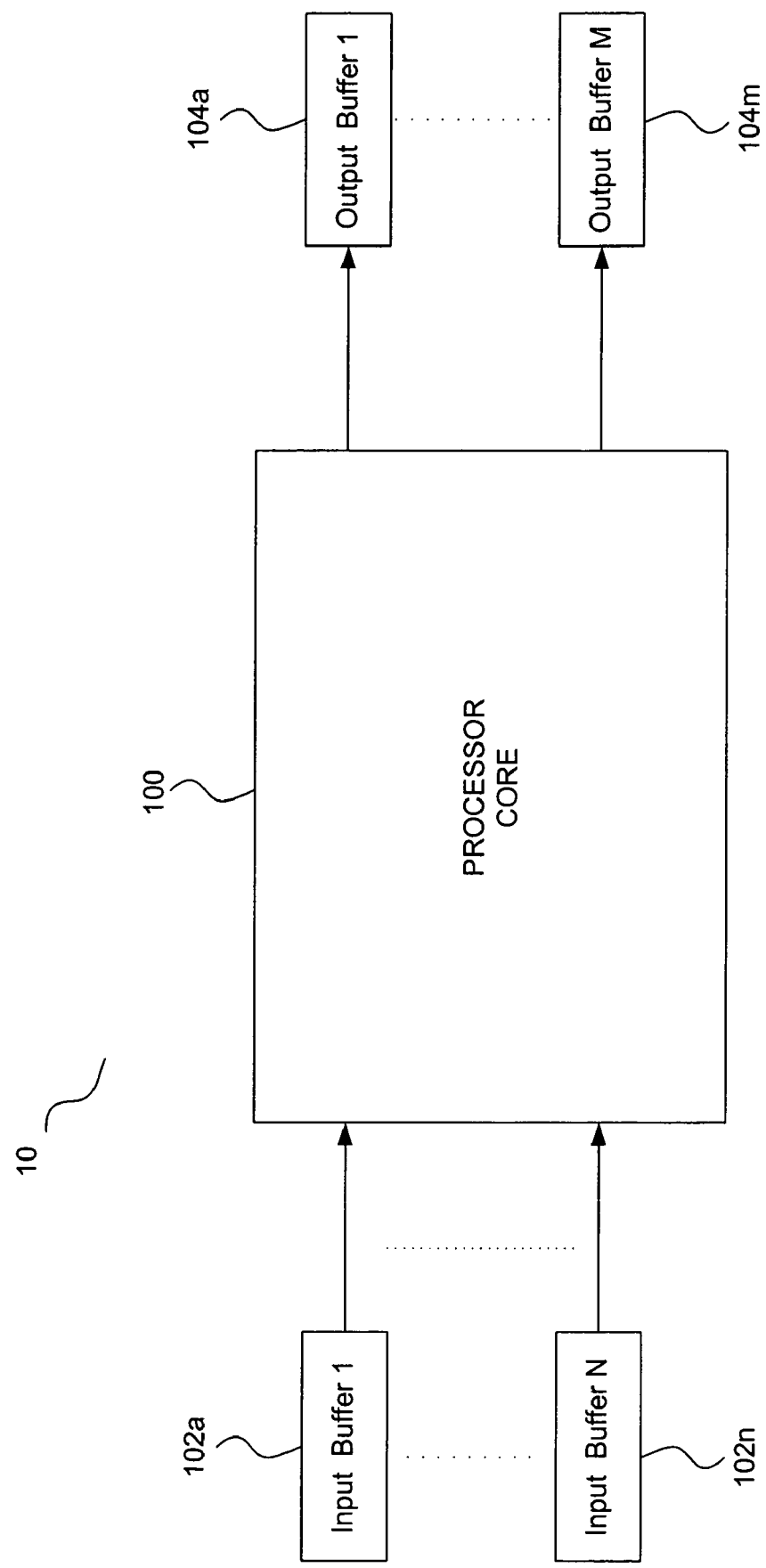
FIG. 1 is a diagram of a processing system according to an embodiment of the present invention.

FIG. 1 illustrates an example processing system 10 according to an embodiment of the present invention. As shown in FIG. 1, processing system 10 includes a processor core 100 coupled to one or more input buffers 102 and to one or more output buffers 104. Processor core 100 reads and processes data from input buffers 102. Processor core 100 writes data to output buffers 104. In embodiments of the present invention, one or more of the input buffers 102 and/or output buffers 104 are stream buffers that provide data in a streaming fashion.

Figure 2:
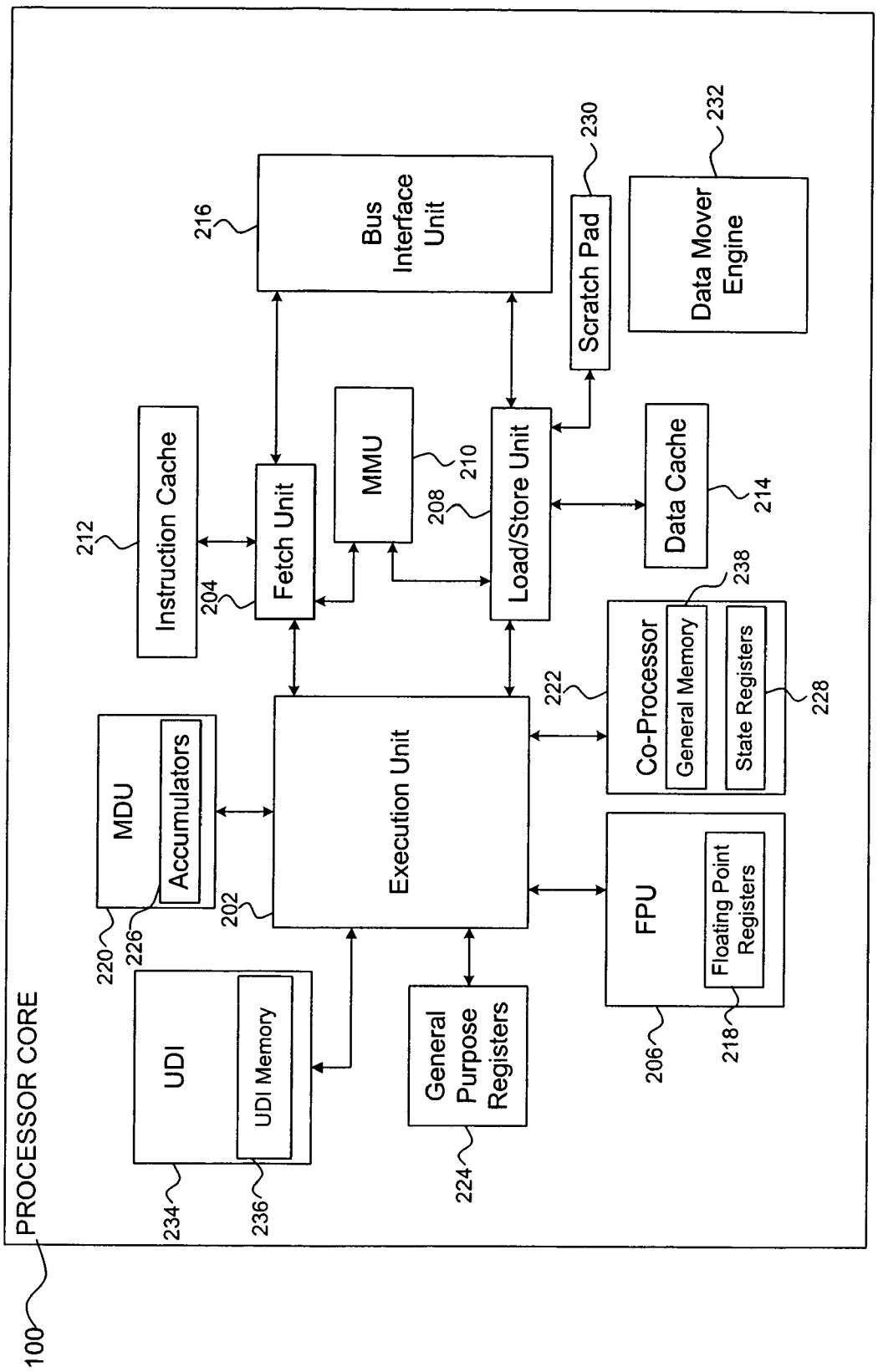
FIG. 2 is a more detailed diagram of one embodiment of the processor core of FIG. 1.

FIG. 2 is a more detailed diagram of processor core 100 according to an embodiment of the present invention. As shown in FIG. 2, processor core 100 includes an execution unit 202, a fetch unit 204, a floating point unit 206, a load/store unit 208, a memory management unit (MMU) 210, an instruction cache 212, a data cache 214, a bus interface unit 216, a multiply/divide unit (MDU) 220, a co-processor 222, general purpose registers 224, a scratch pad 230, a data mover engine 232, and a core extend unit 234. While processor core 100 is described herein as including several separate components, many of these components are optional components and will not be present in each embodiment of the present invention, or components that may be combined, for example, so that the functionality of two components reside within a single component. Thus, the individual components shown in FIG. 2 are illustrative and not intended to limit the present invention.

Execution unit 202 preferably implements a load-store (RISC) architecture with single-cycle arithmetic logic unit operations (e.g., logical, shift, add, subtract, etc.). Execution unit 202 interfaces with fetch unit 204, floating point unit 206, load/store unit 208, multiple-divide unit 220, co-processor 222, general purpose registers 224, data mover engine 232 and core extend unit 234.

Fetch unit 204 is responsible for providing instructions to execution unit 202. In one embodiment, fetch unit 204 includes control logic for instruction cache 212, a recoder for recoding compressed format instructions, dynamic branch prediction and an instruction buffer to decouple operation of fetch unit 204 from execution unit 202. Fetch unit 204 interfaces with execution unit 202, memory management unit 210, instruction cache 212, and bus interface unit 216.

Floating point unit 206 interfaces with execution unit 202 and operates on non-integer data. Floating point unit 206 includes floating point registers 218. In one embodiment, floating point registers 218 may be external to floating point unit 206. Floating point registers 218 may be 32-bit or 64-bit registers used for floating point operations performed by floating point unit 206. Typical floating point operations are arithmetic, such as addition and multiplication, and may also include exponential or trigonometric calculations.

Load/store unit 208 is responsible for data loads and stores, and includes data cache control logic. Load/store unit 208 interfaces with data cache 214 and scratch pad 230 and/or a fill buffer (not shown). Load/store unit 208 also interfaces with memory management unit 210 and bus interface unit 216.

Memory management unit 210 translates virtual addresses to physical addresses for memory access. In one embodiment, memory management unit 210 includes a translation lookaside buffer (TLB) and may include a separate instruction TLB and a separate data TLB. Memory management unit 210 interfaces with fetch unit 204 and load/store unit 208.

Instruction cache 212 is an on-chip memory array organized as a multi-way set associative or direct associative cache such as, for example, a 2-way set associative cache, a 4-way set associative cache, an 8-way set associative cache, et cetera. Instruction cache 212 is preferably virtually indexed and physically tagged, thereby allowing virtual-to-physical address translations to occur in parallel with cache accesses. In one embodiment, the tags include a valid bit and optional parity bits in addition to physical address bits. Instruction cache 212 interfaces with fetch unit 204.

Data cache 214 is also an on-chip memory array. Data cache 214 is preferably virtually indexed and physically tagged. In one embodiment, the tags include a valid bit and optional parity bits in addition to physical address bits. Data cache 214 interfaces with load/store unit 208.

Bus interface unit 216 controls external interface signals for processor core 100. In one embodiment, bus interface unit 216 includes a collapsing write buffer used to merge write-through transactions and gather writes from uncached stores.

Multiply/divide unit 220 performs multiply and divide operations for processor core 100. In one embodiment, multiply/divide unit 220 preferably includes a pipelined multiplier, accumulation registers (accumulators) 226, and multiply and divide state machines, as well as all the control logic required to perform, for example, multiply, multiply-add, and divide functions. As shown in FIG. 2, multiply/divide unit 220 interfaces with execution unit 202. Accumulators 226 are used to store results of arithmetic performed by multiply/divide unit 220.

Co-processor 222 performs various overhead functions for processor core 100. In one embodiment, co-processor 222 is responsible for virtual-to-physical address translations, implementing cache protocols, exception handling, operating mode selection, and enabling/disabling interrupt functions. Co-processor 222 interfaces with execution unit 202. Co-processor 222 includes state registers 228 and general memory 238. State registers 228 are generally used to hold variables used by co-processor 222. General memory 238 may be used to hold temporary values such as coefficients generated during computations. In one embodiment, general memory 238 is in the form of a register file.

General purpose registers 224 are typically 32-bit or 64-bit registers used for scalar integer operations and address calculations. In one embodiment, general purpose registers 224 are a part of execution unit 224. Optionally, one or more additional register file sets, such as shadow register file sets, can be included to minimize content switching overhead, for example, during interrupt and/or exception processing.

Scratch pad 230 is a memory that stores or supplies data to load/store unit 208. The one or more specific address regions of a scratch pad may be pre-configured or configured programmatically while processor 100 is running. An address region is a continuous range of addresses that may be specified, for example, by a base address and a region size. When base address and region size are used, the base address specifies the start of the address region and the region size, for example, is added to the base address to specify the end of the address region. Typically, once an address region is specified for a scratch pad, all data corresponding to the specified address region are retrieved from the scratch pad.

Figure 5A:
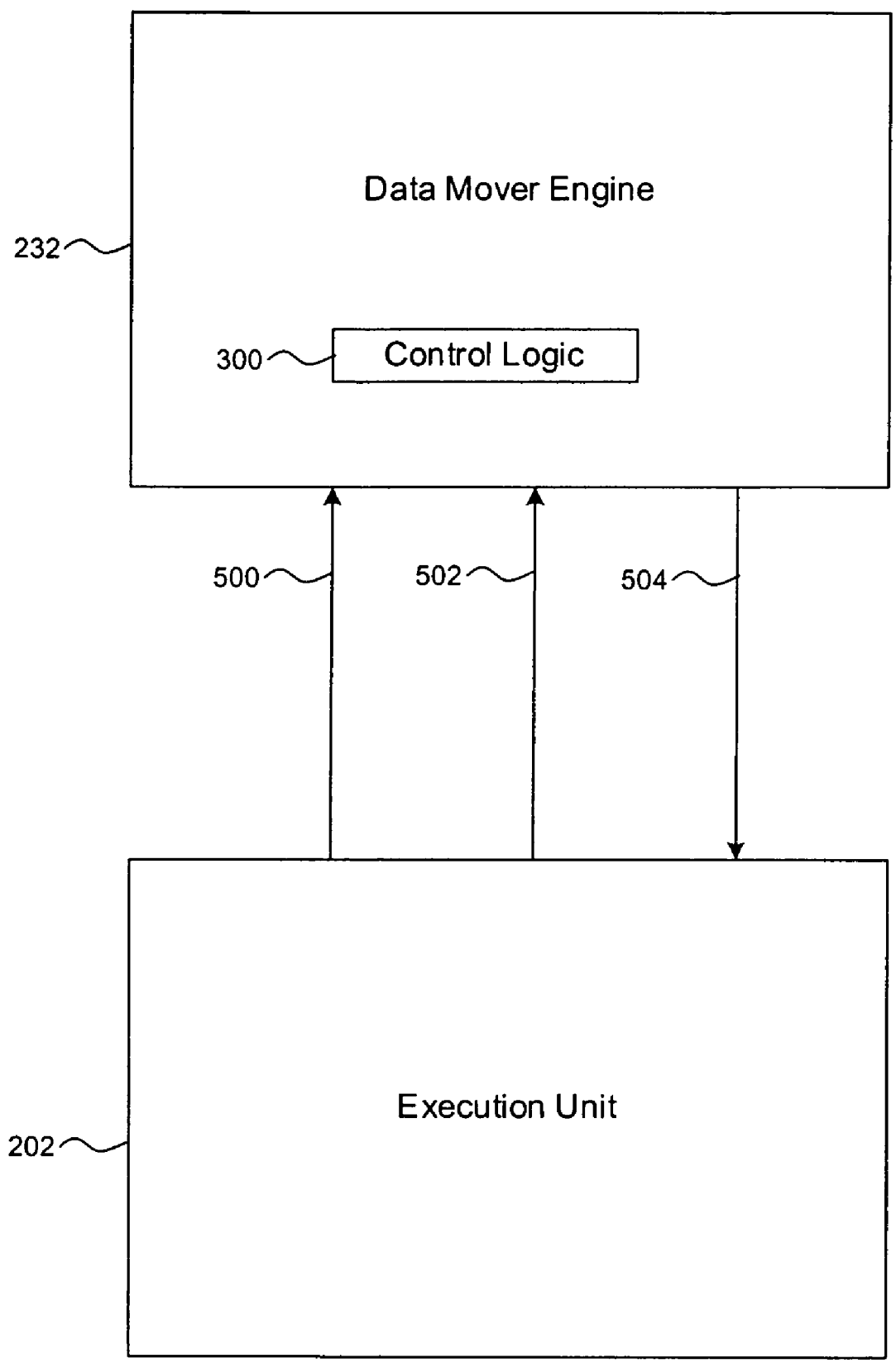
FIG. 5A is a diagram illustrating one embodiment of how a data moving engine of the present invention is coupled to an execution unit.
Figure 5B:
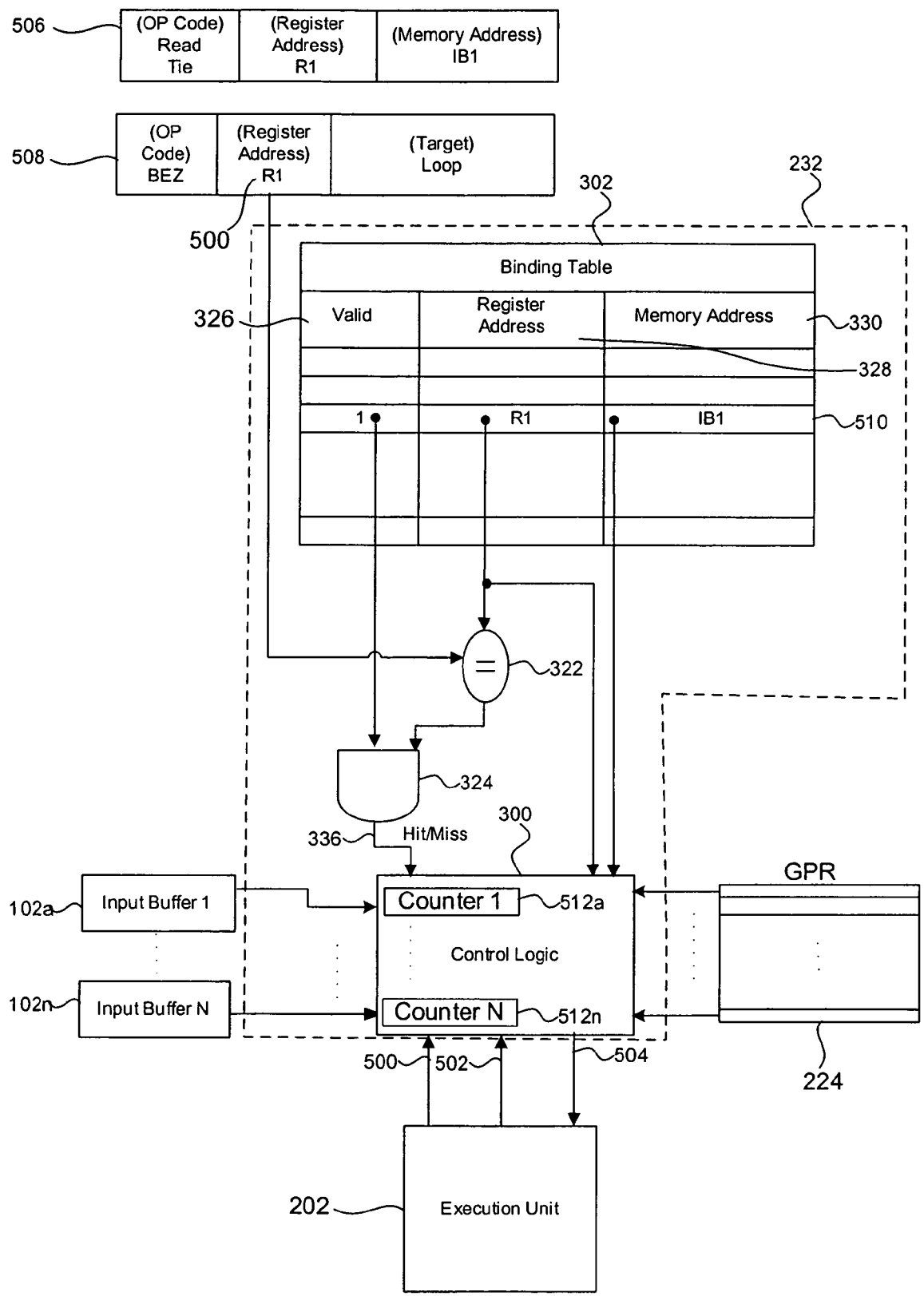
FIG. 5B is a more detailed diagram illustrating one embodiment of the data moving engine of FIG. 5A.
Figure 5C:
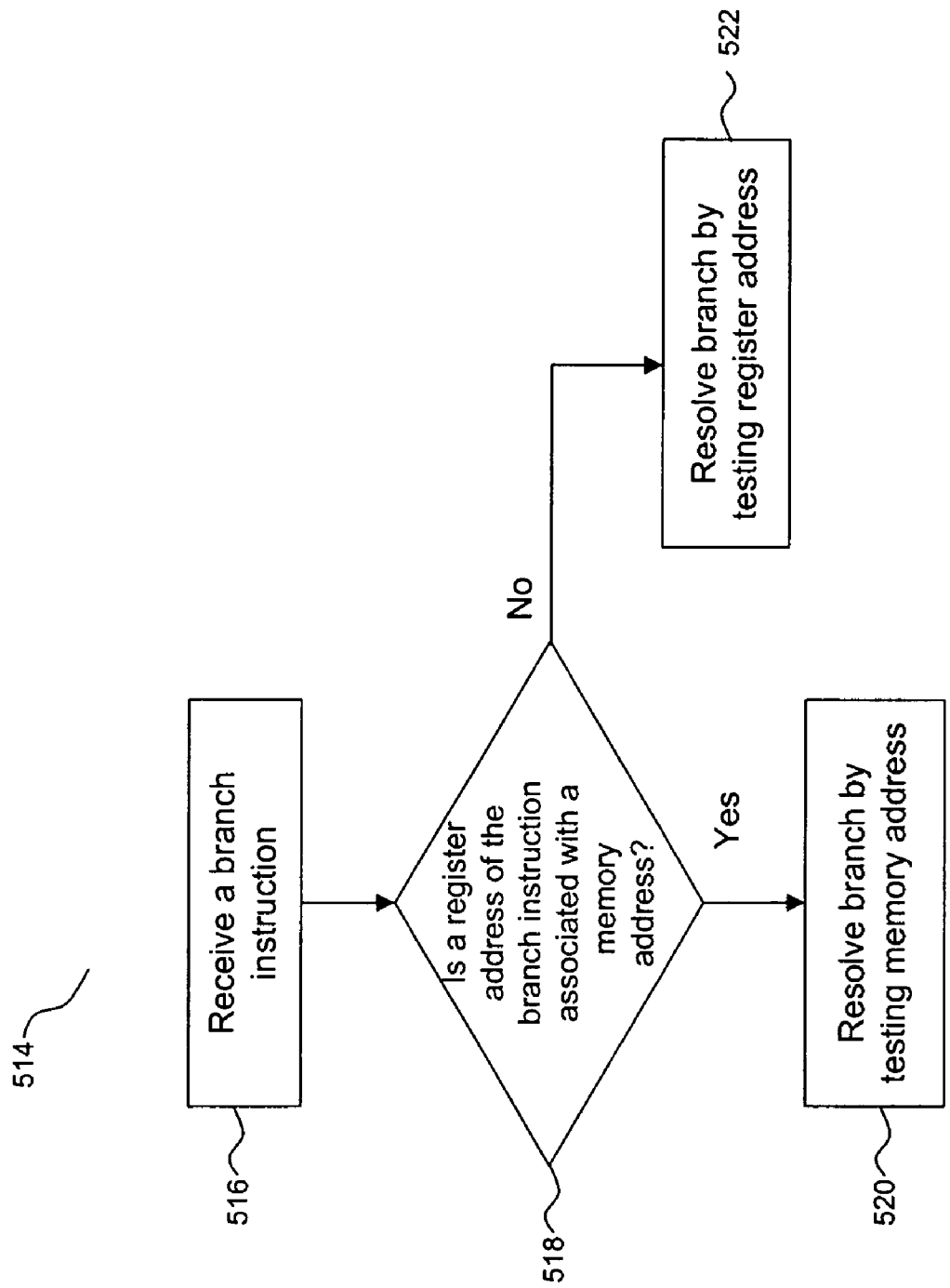
FIG. 5C depicts a flowchart illustrating the steps of a third method of the present invention.
Figure 6A:
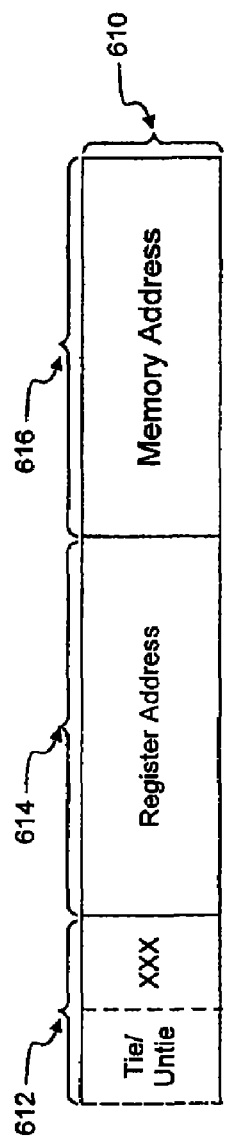
FIG. 6A-6E illustrate example formats of instructions according to embodiments of the invention.
Figure 6B:
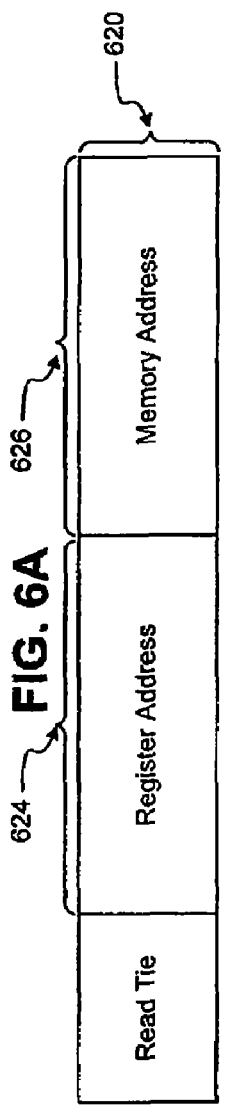

Data mover engine 232 causes execution unit 202 to operate upon data read from a buffer associated with a software accessible register address of processor 100 following execution of a read-tie instruction according to the present invention (see FIG. 6B). In one embodiment, data mover engine 232 causes execution unit 202 to write data to a buffer associated with a software accessible register address following execution of a single write-tie instruction or a dual write-tie instruction according to the present invention (see FIGS. 6C and 6D). In the case of a dual write-tie instruction, data mover engine 232 causes execution unit 202 to write the data both to the buffer associated with a software accessible register address and the software accessible register. Additional details and features of data mover engine 232 are described below with reference to FIGS. 3-5.

User Defined Instruction (UDI) unit 234 allows processor core 100 to be tailored for specific applications. UDI 234 allows a user to define and add their own instructions that may operate on data stored, for example, in general purpose registers 224. UDI 234 allows users to add new capabilities while maintaining compatibility with industry standard architectures. UDI 234 includes UDI memory 236 that may be used to store user added instructions and variables generated during computation. In one embodiment, UDI memory 236 is in the form of a register file.

Figure 3A:
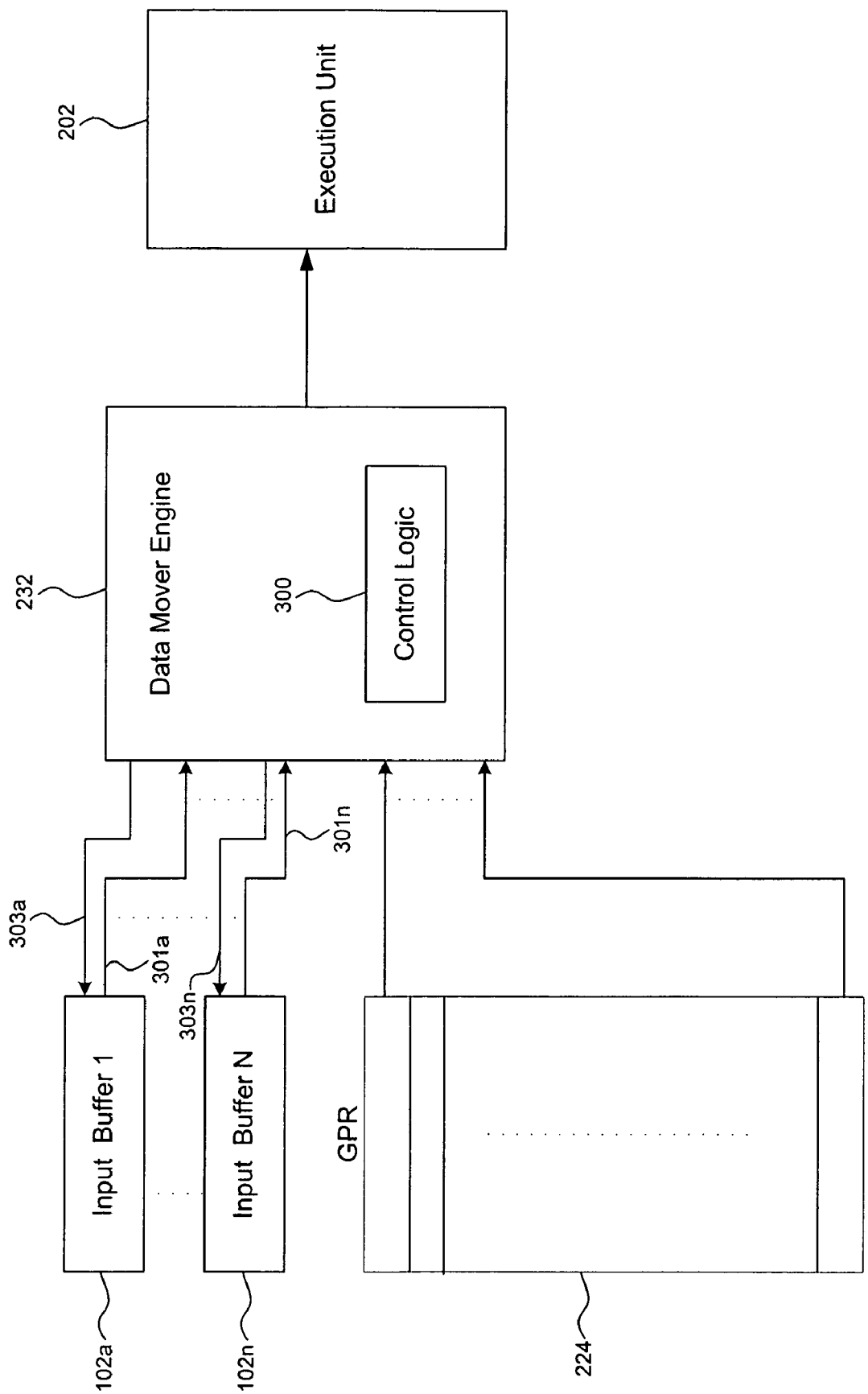
FIG. 3A is a diagram illustrating one example of how the data moving engine of FIG. 2 routes data to the execution unit.

FIG. 3A is a more detailed diagram illustrating one embodiment of data mover engine 232. As shown in FIG. 3A, data mover engine 232 routes data from input buffers 102 and/or software accessible registers such as general purpose registers 224 to execution unit 202. Input buffers 102 send data to data mover engine 232 via data bus 301 in accordance with addressing information placed on address bus 303 by data mover engine 232. As used herein, the term software accessible register means an on-chip register including but not limited to, for example, a general purpose register, a floating point register, a co-processor register, an accumulation register, a state register, et cetera.

Data mover engine 232 includes control logic 300. Control logic 300 is used in routing data from general purpose registers 224 and/or input buffers 102 to execution unit 202. In one embodiment, following execution of a read-tie instruction that associates one of input buffers 102 with a general purpose register 224, data mover engine 232 causes the execution unit 202 to operate upon data read from the associated input buffer 102 in response to instructions that specify operating upon data from the general purpose register 224. This eliminates the need to execute a load instruction to move the data from an input buffer 102 to a general purpose register 224 before the data can be operated upon by execution unit 202.

Figure 3B:
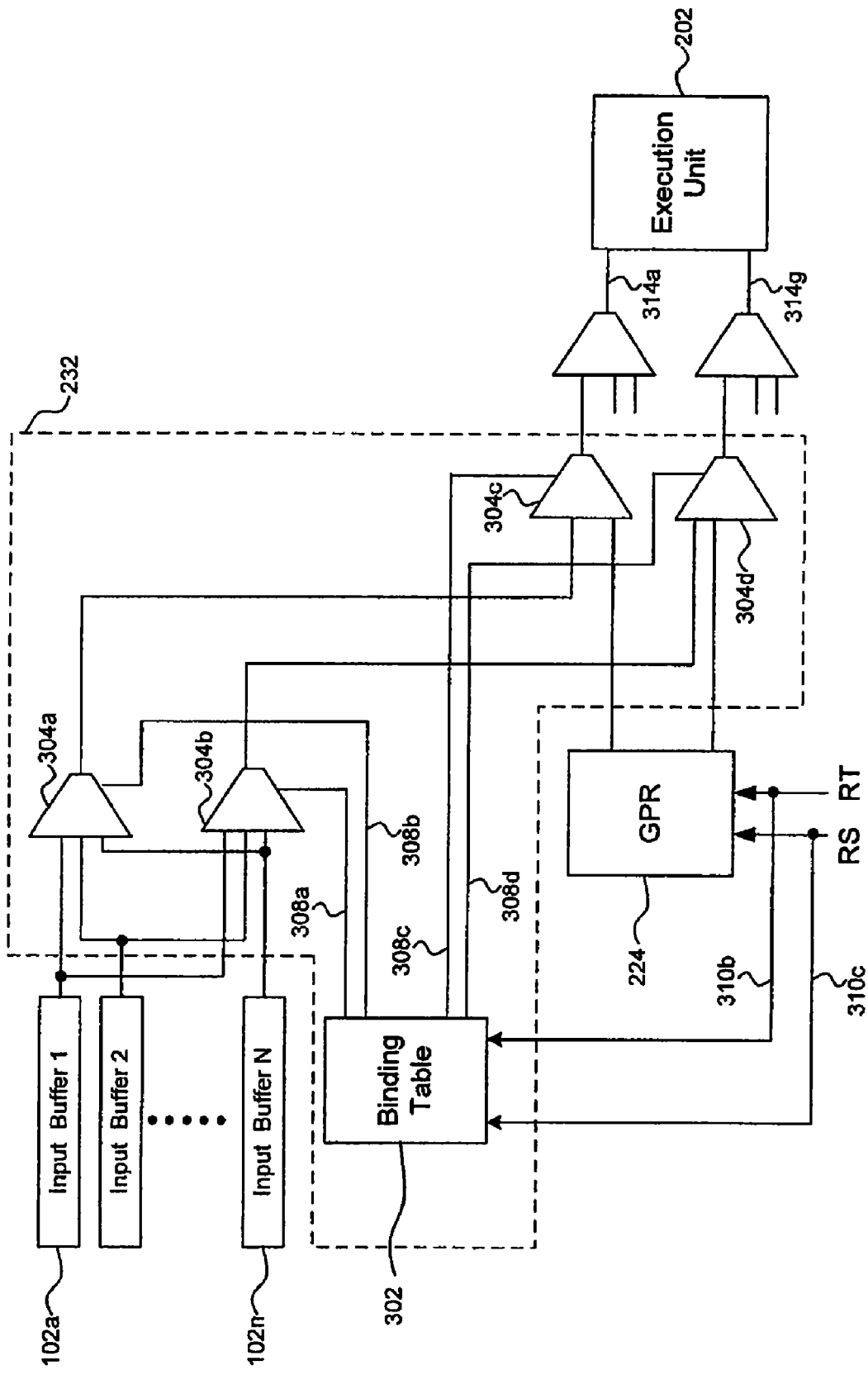
FIG. 3B is a more detailed diagram illustrating one embodiment of data moving engine of FIG. 3A.
Figure 3C:
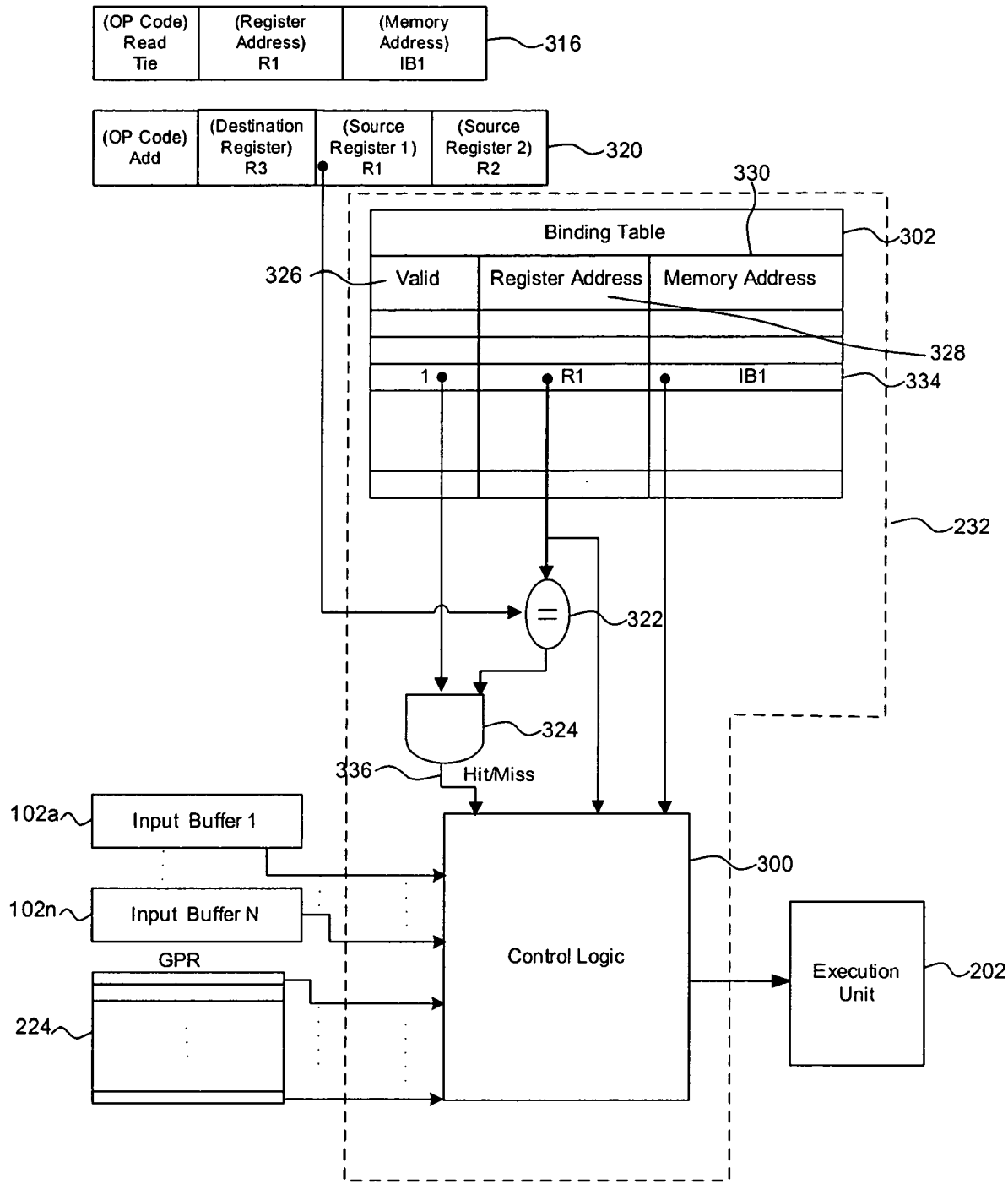
FIG. 3C is a more detailed diagram further illustrating the data moving engine of FIG. 3B.

In an embodiment, associations between input buffers 102 and software accessible register addresses, such as general purpose register 224 addresses, are maintained using a binding table (see, e.g., binding table 302 in FIG. 3C). When execution unit 202 requires data from a software accessible register (for example, in response to an add instruction that identifies the software accessible register as a source of data), control logic 300 determines if there is a current association between the software accessible register address and a buffer such as input buffer 102. If there is a current association, control logic 300 causes data mover engine 232 to route data from the associated buffer, instead of from the software accessible register, to execution unit 202. If there is no current association between the software accessible register address and a buffer, control logic 300 causes data mover engine 232 to route data from the software accessible register to execution unit 202.

As described herein, in embodiments, addressing and read control of input buffers 102 is controlled by data mover engine 232. In one embodiment, the location of the next data element to be accessed from an input buffer 102 is selected via an address supplied by data mover engine 232 using address bus 303. A read pointer (not shown) for input buffer 102 is used to determine the location in input buffer 102 that is to be read. In one embodiment, the read pointer can be incremented (e.g. as in a First-In-First-Out buffer) to point to the next data element. The data mover engine 232 causes execution unit 202 to operate upon the next data element from an input buffer associated with a register each time an instruction specifies operating upon data from the register. In one embodiment, a data value from an input buffer location may optionally be read multiple times and in this case the read pointer is not advanced by data mover 232 until the next data element from input buffer 102 is required to be accessed. The addressing and control of input buffers 102 is implementation and program dependent.

Input buffers 102 typically contain multiple pieces of data. As described in more detail below, input buffers are accessed in accordance with programmable memory transactions. In one embodiment, each input buffer 102 preferably comprises a pair of buffers (e.g. a split buffer design). When a first buffer of the pair is full, it is read by data mover engine 232. While data mover engine 232 is reading the first buffer of the pair, the second buffer of the pair can be filled with new data. After data mover engine 232 has read all the data from the first buffer of the pair, it begins to read the second buffer of the pair. While data mover engine 232 is reading the second buffer of the pair, the first buffer of the pair can be filled with new data.

FIG. 3B is a more detailed diagram illustrating one embodiment of data mover engine 232. In this embodiment, data mover engine 232 includes a binding table 302 that generates control signals 308. Control signals 308 are used to control the operation of multiplexers (muxes) 304. In operation, for example during instruction decoding, one or more signals 310 are sent to a software accessible register (such as GPR 224) and binding table 302 of data mover engine 232. The signals 310 are used to indicate a request for source data corresponding to a particular address. In response to signals 310, binding table 302 generates control signals 308.

As described herein, in embodiments of the present invention, muxes 304 are used to select data from input buffers 102. In one embodiment shown in FIG. 3B, mux 304a receives control signal 308a from binding table 302 to select data from one of input buffers 102a-n. Mux 304b receives control signal 308b from binding table 302 to select data from another one of input buffers 102a-n. Muxes 304c and 304d receive data from muxes 304a and 304b, respectively, and from GPR 224. Mux 304c receives control signal 308c from binding table 302 to select one data value from mux 304a and GPR 224. Mux 304d receives control signal 308d from binding table 302 to select another data value from mux 304b and GPR 224.

FIG. 3C is another detailed diagram of data mover engine 232 according to an embodiment of the present invention. In the embodiment shown in FIG. 3C, binding table 302 includes a valid column 326, a register address column 328, and a memory address column 330. In each row of binding table 302, register address column 328 stores the address of a register associated with a memory address stored in the same row under memory address column 330. Each row also stores a valid bit in valid column 326 to indicate if the entry in that row is valid or invalid. For example, in one embodiment, a value of 1 in valid column 326 indicates a valid entry, and a value of 0 indicates an invalid entry.

In operation, as illustrated in FIG. 3C, a read-tie instruction 316 is used to associate a register address R1 with a memory/input buffer address IB1 corresponding to input buffer 102a. Execution of read-tie instruction 316 results in binding table 302 storing in row 334 an address value R1 under register address column 328, address value IB1 under memory address column 330, and a value of 1 under valid column 326.

In a conventional RISC processor, execution of add instruction 320 shown in FIG. 3C will always cause the processor's execution unit to add values stored in source registers R1 and R2 and store the resulting value in destination register R3. However, this is not the case when add instruction 320 is executed by a processor according to the present invention. As described herein, data mover engine 232 can provide values for example from buffers associated with software accessible registers in response to instructions specifying a software accessible register.

As illustrated by FIG. 3C, in response to add instruction 320, data mover engine 232 compares the address of each source register specified by add instruction 320 to addresses stored in binding table 302 under register address column 328 (e.g., register address value R1 from row 334 of binding table 302 and the value from the source register 1 field of add instruction 320 are compared by comparator 322). If the values match, the comparison results in a 1 and that value is fed into AND gate 324 along with the valid bit from row 334. Based on the outcome of the comparison and the valid bit, AND gate 324 generates a hit/miss signal 336. In an embodiment, AND gate 324 generates a value of 1 to indicate a hit if there is a match of address values and the matching address value is valid. A value of 0 is generated to indicate either a miss has occurred or any matching address value is invalid. In the specific example illustrated in FIG. 3C, because the entry in row 334 is valid and the register address in row 334 matches the register address in the source register 1 field of add instruction 320, AND gate 336 would generate a value of 1 for hit/miss signal 336.

Hit/miss signal 336 along with the register address R1 and the memory address IB1 from row 334 are provided as inputs to control logic 300. In the example shown in FIG. 3C, as noted above, control logic 300 receives a hit/miss signal 336 value of 1. Accordingly, data mover engine 232 routes data read from memory address IB1 (input buffer 102a) to execution unit 202. This occurs because register address R1 is currently associated with memory address IB1 as a result of the execution of read-tie instruction 316. If control logic 300 had received a hit/miss signal 336 value of 0, data mover engine 232 would have provided data from register R1 to execution unit 202.

As will be understood based on the description herein, data mover engine 232 also performs address comparisons for the other data fields of add instruction 320, as well as data fields of other instructions, in a manner similar to that described above with regards to the source register 1 field of add instruction 320.

As described herein, in an embodiment, due to a memory transaction, the data mover engine 232 stores in a counter, register or table entry associated with a particular input buffer, the number of data elements that are to be accessed/processed from that buffer. The memory transaction can be setup by a programmer for a buffer before tying a register to that buffer. A load instruction can load the necessary fields for the memory transaction in the counter, register or table entry associated with the buffer. The fields for the memory transaction may represent the number of elements to be read from the buffer, the start address, the width of the data to be transferred during each transaction and the stride for each transaction.

Figure 3D:
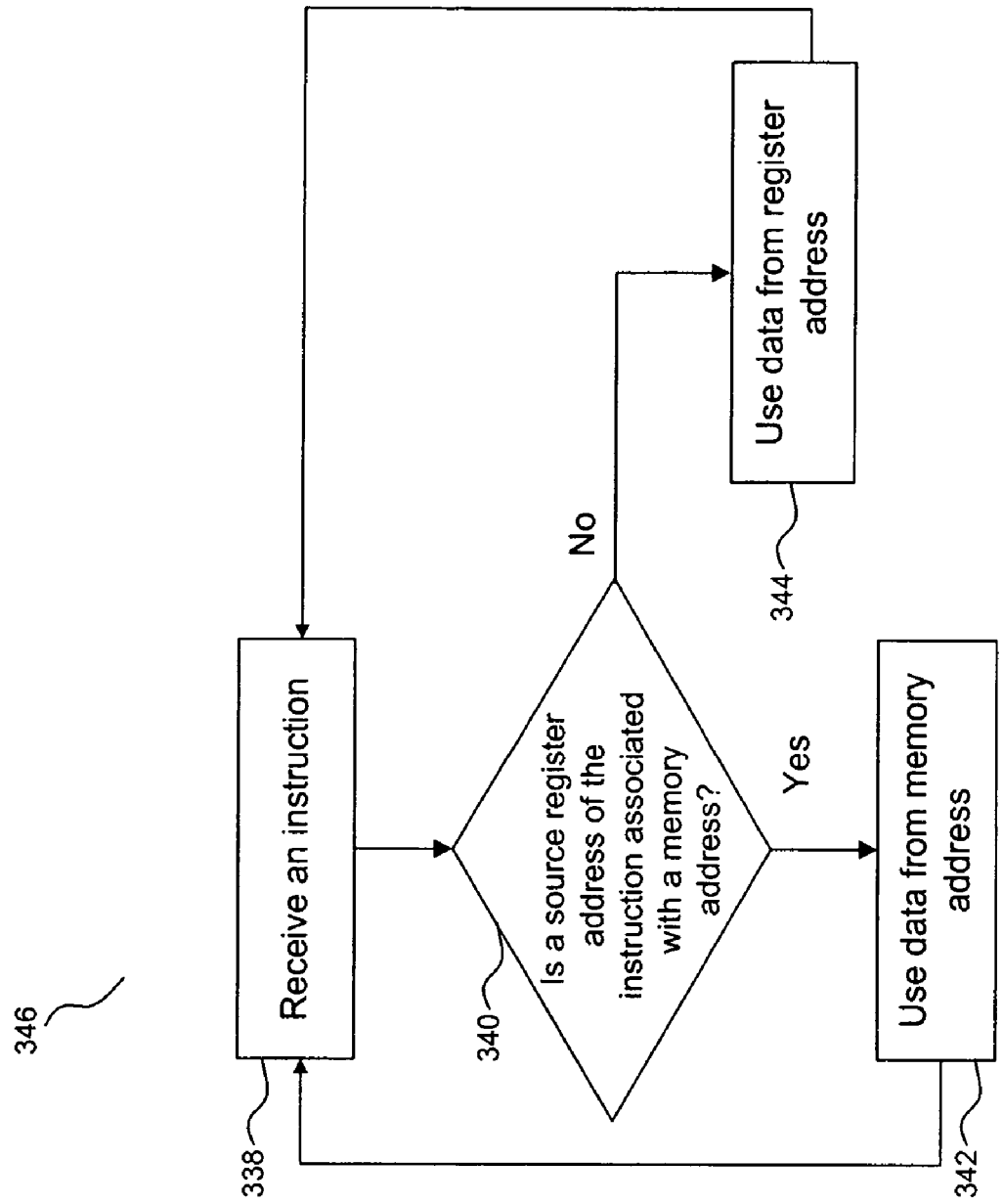
FIG. 3D depicts a flowchart illustrating the steps of a first method of the present invention.

FIG. 3D is a flowchart illustrating the steps of a method 346 for routing data from register addresses or memory addresses to an execution unit of a processor according to an embodiment of the invention. While method 346 can be implemented, for example, using a processor core according to the present invention, such as processor core 100, it is not limited to being implemented by processor core 100. Method 346 starts with step 338.

In step 338, an instruction is received/fetched, for example, from an instruction cache. The instruction can be fetched, for example, using a fetch unit of a processor core. Control passes from step 338 to step 340.

In step 340, a determination is made regarding whether a source register address of the instruction fetched in step 338 is associated with a memory address. Control passes from step 340 to step 342 or step 344.

In step 342, data from the memory address is used by an execution unit of the processor core if it was determined in step 340 that the memory address is associated with a source register address of the instruction fetched in step 338. The data from the memory address is preferably routed to the execution unit by a data mover engine. Control passes from step 342 to step 338.

In step 344, data from the source register address is used by the execution unit of the processor core if it is determined in step 340 that the source register address of the instruction fetched in step 338 is not associated with any memory address. Control passes from step 344 to step 338.

As will be understood based on the description herein, the steps of method 346 may be performed more than once, for example, if an instruction received in step 338 includes more than one data source field.

Figure 4A:
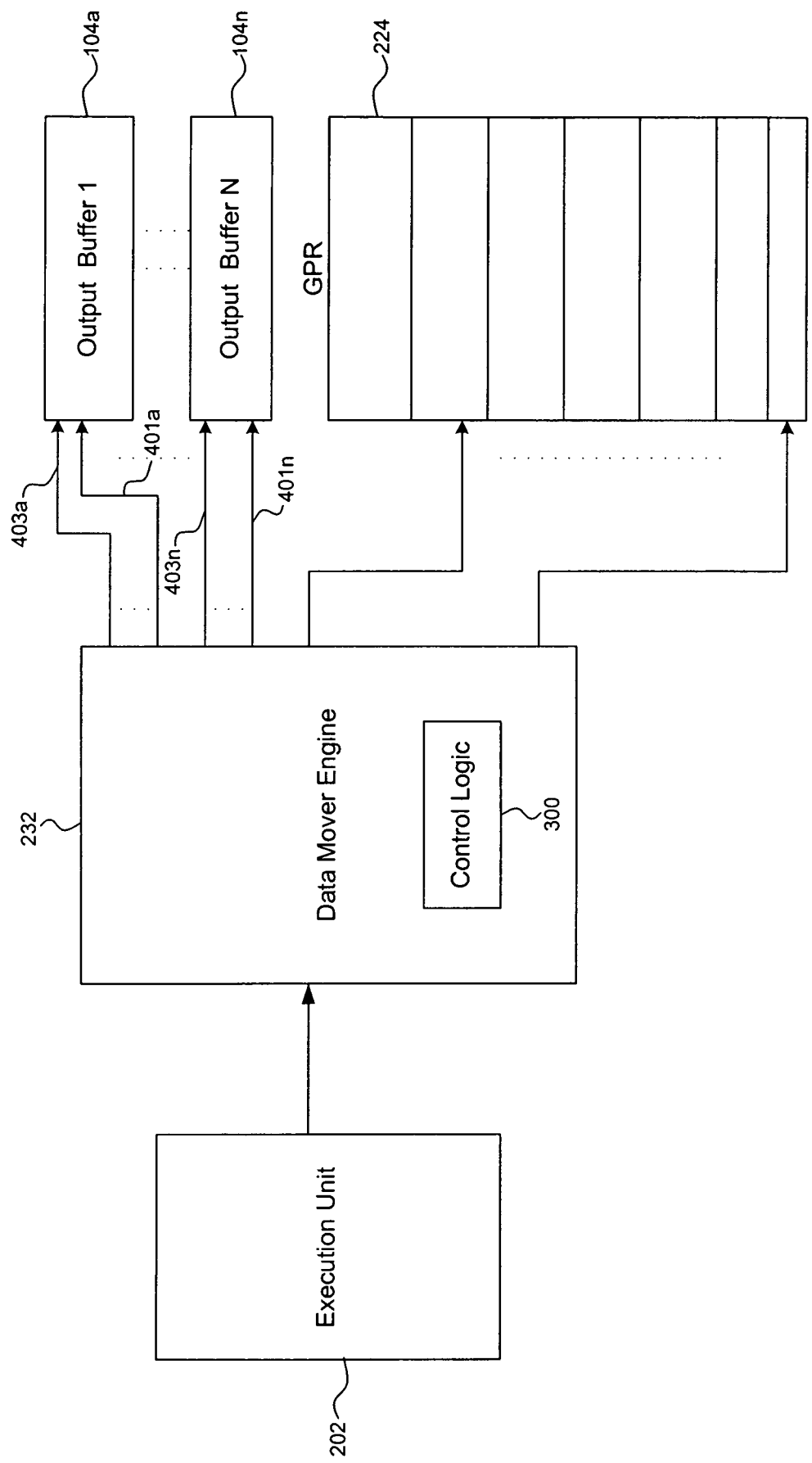
FIG. 4A is a diagram illustrating one example of how the data moving engine of FIG. 2 routes data from the execution unit.

FIG. 4A is a diagram illustrating an embodiment of data mover engine 232 used for routing data from execution unit 202 to one or both of a software accessible register such as a general purpose register 224 and one of output buffers 104. In the example of FIG. 4A, data mover engine 232 is shown coupled to output buffers 104a-n and GPR 224. Data mover engine 232 is capable of routing data from execution unit 202 to a register in GPR 224 and/or one of output buffers 104a-n based on signals from control logic 300. Output buffers 104 receive data from data mover engine 232 via data bus 401 in accordance with addressing information placed on address bus 403 by data mover engine 232. In one example, following execution of a single write-tie instruction according to the present invention (see FIG. 6C) that associates one of output buffers 104a-n with a register of GPR 224, data mover engine 232 causes execution unit 202 of processor 100 to write data to one of output buffers 104a-n in response to instructions that specify writing data to an associated register. In another example, following execution of a dual write-tie instruction (see FIG. 6D) that associates one of output buffers 104a-n with a register of GPR 224, data mover engine 232 causes execution unit 202 to write data both to one of output buffers 104a-n and to the associated register in response to instructions that specify writing data to the associated register. In an embodiment, the association between input buffers 104a-n and registers in GPR 224 is stored in a binding table in data mover 232.

In an embodiment, when an instruction requires execution unit 202 to write data to a register in GPR 224, control logic 300 is used to determine if there is a current association between the address of a register in GPR 224 and one of output buffers 104a-n. If there is an association that was created using a single write-tie instruction, control logic 300 generates control signals that cause execution unit 202 to write data to one of the associated output buffers 104a-n instead of to the register in GPR 224. If there is a current association that was created using a dual write-tie instruction according to the present invention, control logic 300 supplies control signals that cause execution unit 202 to write data both to one of the associated output buffers 104a-n and to the register in GPR 224. If none of output buffers 104 is associated with the specified register in GPR 224, control logic 300 supplies control signals that cause execution unit 202 to write the data only to the register in GPR 224.

As described herein, in embodiments, addressing and write control of output buffers 104 is controlled by data mover engine 232. In one embodiment, the location of the next data element to be written in an output buffer 104 is selected via an address supplied by data mover engine 232 using address bus 403. A write pointer (not shown) for output buffer 104 is used to determine the location in output buffer 104 that is to be written. In one embodiment, the write pointer can be incremented automatically to point to the next location. Data mover engine 232 causes execution unit 202 to write to the next location of an output buffer associated with a register each time an instruction specifies writing data to the register. The addressing and control of output buffers 104 is implementation and program dependent.

Figure 4B:
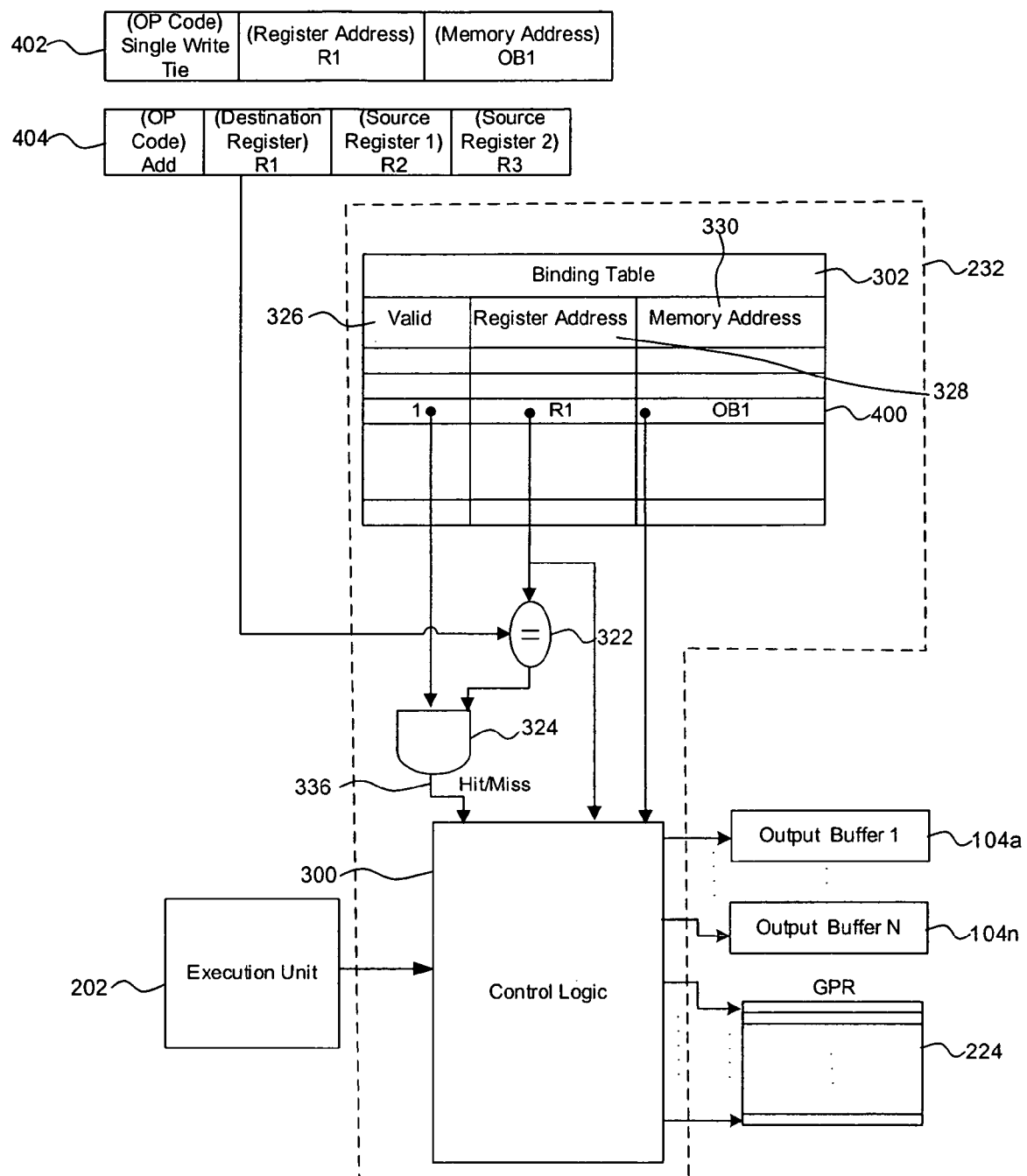
FIG. 4B is a more detailed diagram illustrating one embodiment of the data moving engine of FIG. 4A.

FIG. 4B is a detailed diagram of data mover engine 232 according to an embodiment of the invention. In the example shown in FIG. 4B, a single write-tie instruction 402 is used to associate register address R1 of GPR 224 with memory address OB1 of output buffer 104a before execution of an add instruction 404. Execution of single write-tie instruction 402 results in binding table 302 storing in row 400 a value of R1 under register address column 328, a value of OB1 under the memory address column 330 and a value of 1 under valid column 326.

Add instruction 404 specifies that the values stored in source registers R2 and R3 are to be added and that the resulting value is to be stored in register R1. However, as described herein, in an embodiment in response to add instruction 404, data mover engine 232 compares the address of the destination register of add instruction 404 against addresses stored for registers in binding table 302 under register address column 328 to determine where to write the resulting value.

For the example of FIG. 4B, in response to add instruction 404, the register address R1 from row 400 and from the destination register address of add instruction 404 are compared by comparator 322. In this case, because the values match, the comparison results in a value of 1 and that value is provided to AND gate 324 along with the valid bit in row 400. The output of AND gate 324 is hit/miss signal 336. Because the entry in row 400 is valid and the register address in row 400 matches the register address in the destination register of add instruction 404, hit/miss signal 336 has a value of 1. Hit/miss signal 336 along with the register address R1 and the memory address OB1 from row 400 are provided to control logic 300. In this example, since control logic 300 receives a value of 1 for hit/miss signal 336, memory address OB1 is used to route data from execution unit 202 to output buffer 104a. If control logic 300 had received a value of 0 for hit/miss signal 336, destination register address R1 would have been used to route data from execution unit 202 to the corresponding register in GPR 224.

As another example, consider an instance where the op code of an instruction such as instruction 402 specifies that the instruction is a dual write-tie instruction instead of a single write-tie. In this case, control logic 300 uses memory address OB1 to route data from execution unit 202 to output buffer 104a and also register address R1 to route the data to the corresponding register in GPR 224. In an embodiment, binding table 302 is modified to include a tie-type column (not shown) that holds two bits to indicate whether the register address and memory address association is formed as a result of a single write-tie instruction, a dual write-tie instruction, or a read-tie instruction. For example, in one embodiment, a 00 value in the tie-type column indicates a read-tie relationship, a 01 value indicates a single write-tie relationship, and a 10 value indicates a dual write-tie relationship. Using data from the tie-type column, control logic 300 can differentiate various types of associations created using read-tie instructions, single write-tie instructions, and dual write-tie instructions.

In another example, a three-bit value in the tie-type column may be used where a 1 in the first least significant bit position (i.e. 001) indicates a read-tie, a 1 in the second least significant bit position (i.e. 010) indicates a single write-tie and a 1 in the most significant bit position indicates a dual write-tie (i.e. 100). Zeroes in all the bit positions (i.e. 000) of the tie-type field indicate an untie.

In an embodiment, bits 011 in the tie-type field indicate a read-tie and a single write-tie of a register to a buffer. In this case, the data moving engine causes the execution unit to operate upon data read from the buffer in response to instructions that specify operating upon data from the register, and the data moving engine causes the execution unit to write data to the buffer in response to instructions that specify writing data to the register.

Bits 101 in the tie-type field indicate a read-tie and a dual write-tie of a register to a buffer. In this case, the data moving engine causes the execution unit to operate upon data read from the buffer in response to instructions that specify operating upon data from the register, and the data moving engine causes the execution unit to write data to the buffer and the register in response to instructions that specify writing data to the register.

As described herein, in an embodiment, due to a memory transaction, the data mover engine 232 stores in a counter, register or table entry associated with a particular output buffer, the number of data elements that are to be written to that buffer. The memory transaction can be setup by a programmer for a buffer before tying a register to that buffer. A load instruction can load the necessary fields for the memory transaction in the counter, register or table entry associated with the buffer. The fields for the memory transaction may be the number of elements to be written to the buffer, the start address, the width of the data to be transferred during each transaction and the stride for each transaction.

In one embodiment, a conditional dual write to a register in GPR 232, in addition to output buffer 104, takes place only when a certain predetermined condition or conditions are met. In one embodiment, as described herein, a memory transaction may be used to define the conditions for a conditional dual write of a register in GPR 232. The conditions for the dual write may be stored in a register or table entry associated with an output buffer 104. The conditions may be stored as a result of a memory transaction or a separate instruction that writes to the register or table entry. As an example, a memory transaction may define the dual write to an associated register in GPR 232 to occur only on every fourth write to an associated output buffer 104. In another example, a register associated using a dual write-tie is written to only when the last element from the corresponding associated output buffer 104 is accessed. The condition for a last element being accessed from an associated output buffer 104 may be determined, for example, using a write pointer associated with output buffer 104.

Figure 4C:
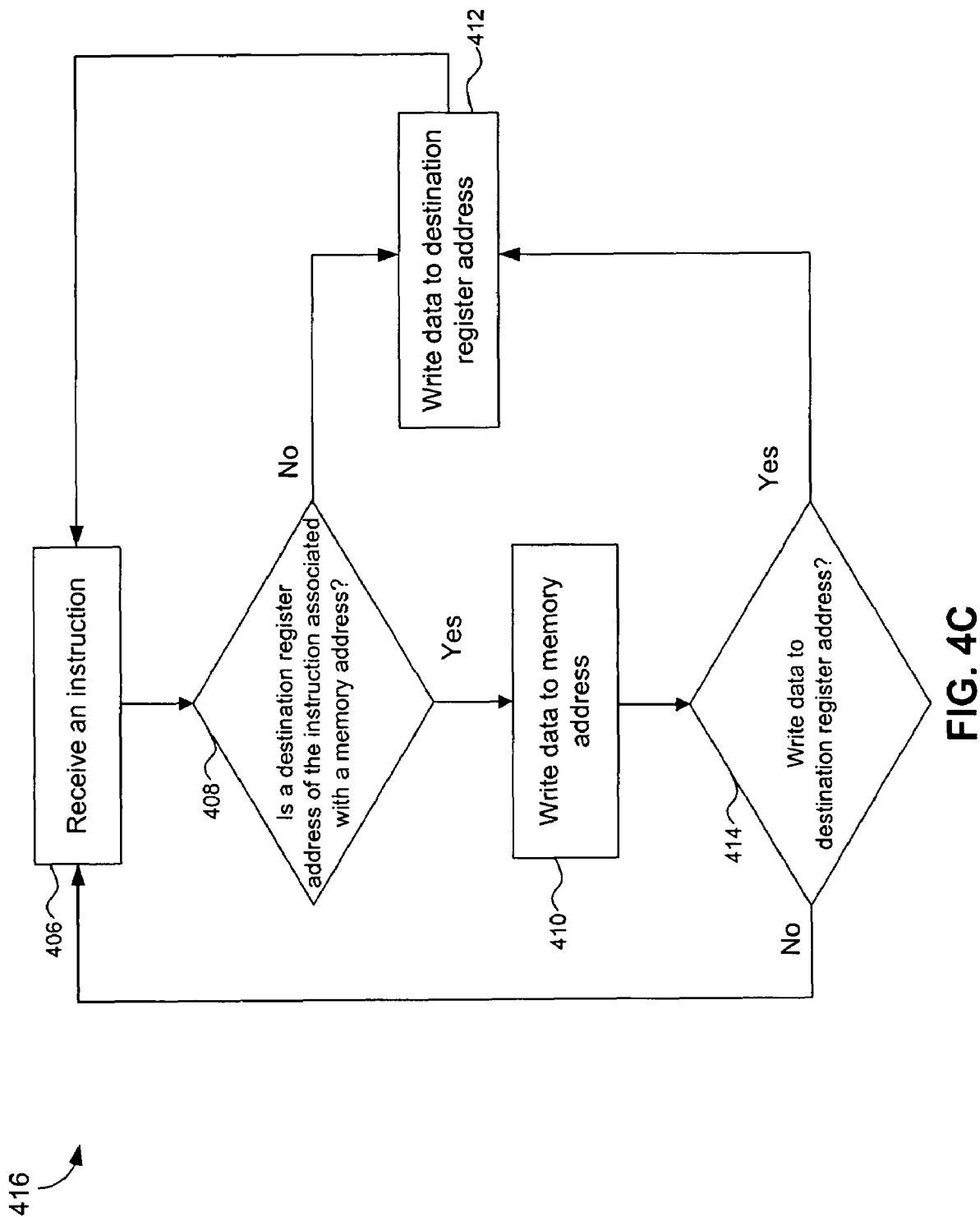
FIG. 4C depicts a flowchart illustrating the steps of a second method of the present invention.

FIG. 4C is a flowchart showing the steps of a method 416 for routing data to register addresses or memory addresses according to an embodiment of the present invention. While method 416 can be implemented, for example, using a processor core according to the present invention, such as processor core 100, it is not limited to being implemented by processor core 100. Method 416 starts with step 406.

In step 406, an instruction is received/fetched, for example, from an instruction cache. The instruction can be fetched, for example, using an instruction fetch unit of a processor core. Control transfers from step 406 to step 408.

In step 408, a determination is made whether a destination register address of the instruction fetched in step 406 is associated with a memory address. If there is an association between the destination register address of the instruction received in step 406 and a memory address, control passes to step 410. Otherwise, control passes to step 412.

In step 410, data from an execution unit of the processor core is written to the memory address associated with the destination register address of the instruction fetched in step 406. Control passes from step 410 to step 414.

In step 412, data from the execution unit of the processor core is written to the destination register address of the instruction fetched in step 406. Control passes from step 412 to step 406.

In step 414, it is determined whether data from the execution unit is also to be written to the destination register address of the instruction fetched in step 406. In an embodiment, as described herein, data from the execution unit is written both to the destination register address and its associated memory address if the association was formed using, for example, a dual write-tie instruction according to the present invention. If it is determined that the data is to be written to the destination register, control passes to step 412. Otherwise, control passes back to step 406.

FIG. 5A is a diagram illustrating example signals used to determine the outcome of a branch instruction according to an embodiment of the invention. In an embodiment, if a register address is associated with a memory address, such as an input buffer memory address, due to execution of a read-tie instruction, the data mover engine 232 stores in a counter the number of data elements that are to be accessed from that memory address. This information can be provided to data mover engine 232, for example, by a field of the read-tie instruction. In another example, the counter value is provided by a memory transaction that sets up the input buffer. Whenever the associated memory address is accessed, the counter is decremented. Upon execution, for example, of a branch-if-greater-than-zero (BGTZ) instruction, data mover engine 232 receives a branch assert signal 502 along with a register address 500 that is specified by the BGTZ instruction to test the branch condition.

In one embodiment, the need for a counter to evaluate a branch condition may be obviated by using a read pointer of an associated input buffer 102 in place of a counter. When a read pointer points to the end of an input buffer 102, the branch condition may be evaluated as true and signaled to execution unit 202 using branch assert signal 502.

In an embodiment, if a register address is associated with a memory address, such as an output buffer memory address, due to execution of a single or dual write-tie instruction, the data mover engine 232 stores in a counter the number of data elements that are to be accessed from that memory address or uses the write pointer of the output buffer as an implicit counter. The counter information can be provided to data mover engine 232, for example, by a field of the single or dual write-tie instruction. Whenever the associated memory address is written to, the counter is decremented. In another example, the counter value is provided by a memory transaction that sets up the output buffer. In a further example, the need for a counter to evaluate a branch condition may be obviated by using a write pointer of an associated output buffer 104 as an implicit counter. When a write pointer points to the end of an output buffer 104, the branch condition is evaluated as true and signaled to execution unit 202 using branch assert signal 502.

In the above embodiment, register address 500 and branch assert signal 502 are supplied by execution unit 202. In response to receiving register address 500 and branch assert signal 502, data mover engine 232 determines whether there is a memory address currently associated with register address 500. If there is an associated memory address, data mover engine 232 uses control logic 300 to check if the counter associated with that memory address has a value greater than 0. If the counter value is greater than 0, control logic 300 of data mover engine 232 asserts a value of 1 via branch control signal 504. A value of 1 is used to indicate to execution unit 202 that the branch is taken. If the counter value is not greater than 0, control logic 300 asserts a value of 0 via branch control signal 504 that indicates to execution unit 202 that the branch is not taken. If there is no associated memory address for register address 500, control logic 300 of data mover engine 232 accesses the data corresponding to register address 500 and checks if it is greater than 0. If the data corresponding to register address 500 is greater than 0, control logic 300 asserts a 1 via branch control signal 504. If the data corresponding to register address 500 is not greater than 0, control logic 300 of data mover engine 232 asserts a 0 via branch control signal 504.

FIG. 5B is another detailed diagram of data mover engine 232 according to an embodiment of the invention. In the example embodiment of FIG. 5B, control logic 300 is depicted as including several counters 512 corresponding to input buffers 102. When a register from GPR 224 is associated with one of the input buffers 102a-n, its corresponding counter holds a value equal to the number of elements that are to be accessed from that buffer. As data elements are read from the buffer, the buffer's associated counter is decremented. In one embodiment, the number of elements to be read from a particular buffer is specified by a field (not shown) in the read-tie instruction used to associate the register with the buffer. Alternatively, in an embodiment, due to a memory transaction, the data mover engine 232 stores in a counter 512, register or table entry associated with a particular buffer 102, the number of data elements that are to be accessed from that buffer 102. The memory transaction can be setup by a programmer for a buffer 102 before tying a register to that buffer 102. A load instruction can load the necessary fields for the memory transaction in counter 512, register or table entry associated with buffer 102. The fields for the memory transaction may be the number of elements to be accessed/processed from the buffer 102, the start address, the width of the data to be transferred during each transaction and the stride for each transaction.

In the example shown in FIG. 5B, a read-tie instruction 506 is executed in order to associate register address R1 of GPR 224 with the memory address IB1 of input buffer 102a. Execution of read-tie instruction 506 results in binding table 302 storing in row 510 a value of R1 under register address column 328, a value of IB1 under memory address column 330, and a value of 1 under valid column 326.

As described herein, following execution of read-tie instruction 506, a BGTZ instruction 508 can be used to check whether there is any additional data to be processed from input buffer 102a. In one embodiment, during execution of BGTZ instruction 508, execution unit 202 sends both a branch assert signal 502 and a register address 500 that corresponds to the register address specified in instruction 508 to data mover engine 232.

In the example of FIG. 5B, register address 500 is the same as register address (R1) of BGTZ instruction 508. In operations, data mover engine 232 compares register address 500 against addresses stored for registers in binding table 302 under register address column 328. The register address from row 510 and register address 500 from BGTZ instruction 508 are compared by comparator 322. Because the values match, the comparison results in a value of 1 and that value is provided to AND gate 324 along with the valid bit from row 510. The output of AND gate 324 is hit/miss signal 336. Because the entry in row 510 is valid and the register address in row 510 matches the register address of BGTZ instruction 508, the value of hit/miss signal 336 is 1. Hit/miss signal 336 along with the register address value (R1) and the memory address value (IB1) from row 510 of binding table 302 are provided to control logic 300. In this example, because control logic 300 receives a 1 for hit/miss signal 336, control logic 300 checks the counter corresponding to IB1 (counter 512a). If the value in counter 512a is greater than 0, control logic 300 asserts a 1 on branch control signal 504 that instructs execution unit 202 to take the branch to the target address (loop) as specified by BGTZ instruction 508. If the value in counter 512a is not greater than 0, control logic 300 asserts a 0 on branch control signal 504 that instructs execution unit 202 to not take the branch.

In one embodiment of data mover engine 232, if the register address 500 does not match any of the register addresses stored under column 328 of binding table 302, the branch condition is evaluated in a conventional manner, for example, control logic 300 accesses the register corresponding to register address 500 (R1) in GPR 224 and checks its value. If the register contains a value greater than 0, control logic 300 asserts a 1 on branch control signal 504 instructing execution unit 202 to take the branch. If the register does not contain a value greater than 0, control logic 300 asserts a 0 on branch control signal 504 that instructs execution unit 202 to not take the branch.

FIG. 5C is a flowchart showing the steps of a method 514 for resolving a conditional branch instruction according to an embodiment of the invention. While method 514 can be implemented, for example, using a processor core according to the present invention, such as processor core 100, it is not limited to being implemented by processor core 100. Method 514 starts with step 516.

In step 516, a branch instruction is received/fetched, for example, from an instruction cache. The instruction can be fetched, for example, using a fetch unit of a processor. Control passes from step 516 to step 518.

In step 518, it is determined whether the register address of the branch instruction fetched in step 516 is associated with a memory address. This association could have been established, for example, as a result of executing a read-tie instruction. If there is an association between the register address of the branch instruction received in step 516 and a memory address, control passes to step 520. Otherwise, control passes to step 522.

In step 520, the branch is resolved by testing a value stored at the memory address (or in a counter register associated with the memory address) to determine whether the branch is taken or not taken. As described herein, this is useful, for example, in determining whether there is any additional data to be processed from the memory address (e.g., an input buffer).

In step 522, the branch is resolved by testing a value stored at the register address (e.g., in the register) to determine whether the branch is taken or not taken.

FIG. 6A illustrates an example format of a generic tie/untie instruction 610 according to an embodiment of the present invention. Instruction 610 can be used to associate or disassociate a register address with a memory address. As shown in FIG. 6A, instruction 610 includes an op code field 612. Two bits "xx" are used to specify whether the instruction implements a read-tie, single write-tie, dual write-tie or untie function. For example, the value 00 can be used to specify a read-tie function, 01 can be used to specify a single write-tie function, 10 can be used to specify a dual write-tie function, and 11 can be used to specify an untie untie. A register address field 614 of instruction 610 is used to specify the address of a register that is to be associated or disassociated with a memory address. A memory address field 616 of instruction 610 is used to specify a memory address that is to be associated or disassociated with the register address specified by field 614. It is to be appreciated that number of bits in an instruction, the number of bits in each field, and the number of the fields represent design and/or implementation choices. For example, instruction 610 can also include a field (not shown) that specifies the name of the register file in which the specified register address is located, for example, GPR register file 224, floating point register file 218, state register file 228 etc.

FIG. 6B illustrates an example format of a read-tie instruction 620 used to associate a register address with a memory address according to an embodiment of the invention. As described herein, execution of a read-tie instruction 620 associates a software accessible register specified by field 624 with a memory address specified by field 626.

Figure 6C:
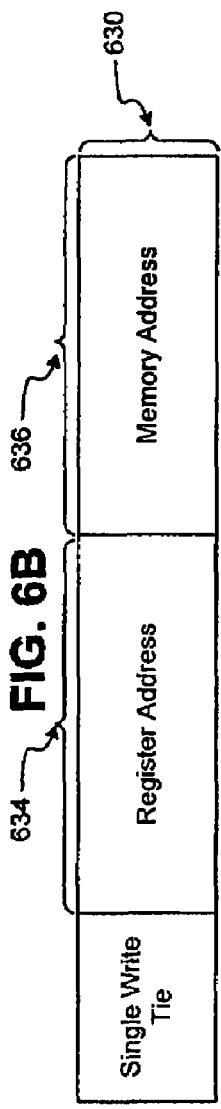

FIG. 6C illustrates an example format of a single write-tie instruction 630 used to associate a register address with a memory address according to an embodiment of the invention. As described herein, execution of a single write-tie instruction 630 associates a software accessible register specified by field 634 with a memory address specified by field 636.

Figure 6D:
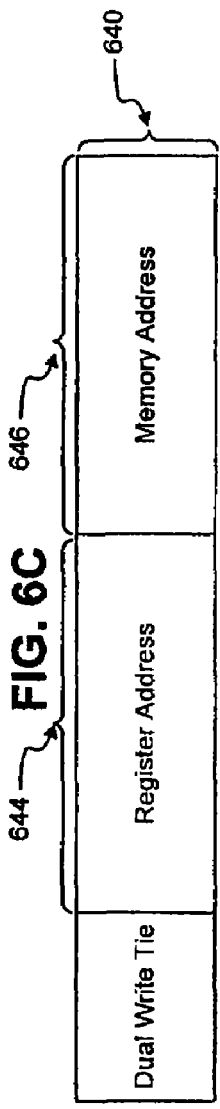

FIG. 6D illustrates an example format of a dual write-tie instruction 640 used to associate a register address with a memory address according to an embodiment of the invention. As described herein, execution of a dual write-tie instruction 640 associates a software accessible register specified by field 644 with a memory address specified by field 646.

Figure 6E:
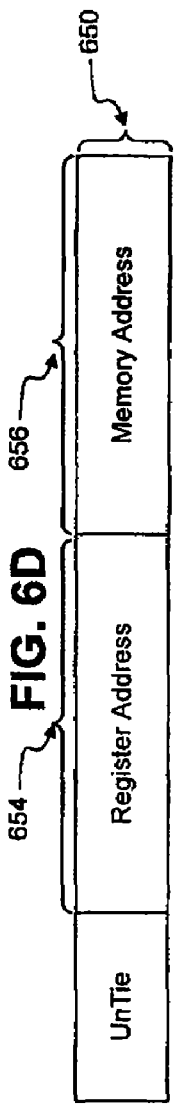

FIG. 6E illustrates an example format of an untie instruction 650 used to disassociate a software accessible register address specified by field 654 from a memory address specified by field 656. Untie instruction 650 is used to disassociate a register address previously associated with a memory address as a result of the execution of a read-tie instruction, a single write-tie instruction, or a dual write-tie instruction.

As described herein, other instructions can be used to associate a software accessible register address with a buffer address. For example, in an embodiment, an association between a specific buffer and a specific software accessible register may be pre-programmed and stored in a register such as a co-processor register in a MIPS architecture. An instruction that writes a specific value to the co-processor register activates the association between the buffer and the software accessible register. An instruction that writes another value to the co-processor register disassociates the buffer from the software accessible register.

In an embodiment, for example, if an instruction writes a first value to the co-processor register, it activates an association between the buffer and the software accessible register such that the data moving engine causes the execution unit to operate upon data read from the buffer in response to instructions that specify operating upon data from the software accessible register. If an instruction writes a second value to the co-processor register, it activates the association between the buffer and the software accessible register such that the data moving engine causes the execution unit to write data to the buffer in response to instructions that specify writing data to the software accessible register. If an instruction writes a third value to the co-processor register, it activates the association between the buffer and the software accessible register such that the data moving engine causes the execution unit to write data to the buffer and to the software accessible register in response to instructions that specify writing data to the software accessible register. If an instruction writes a fourth value to the co-processor register, it disassociates any previous association between the buffer and the software accessible register such that the execution unit operates upon data read from the software accessible register in response to instructions that specify operating upon data from the first software accessible register. Since the instruction writing to the co-processor is a conventional instruction such as a load or move to co-processor zero register (MTC0), the present embodiment has the advantage of not requiring any new instructions to associate buffers with software accessible registers.

To further illustrate the present invention, example pseudo-code is provided below. The pseudo-code is provided for purposes of illustration only and is not intended to limit the present invention in any way. As will become apparent to persons skilled in the relevant arts given the description herein.

The following example pseudo-code is written using two read-tie instructions 620 shown in FIG. 6B.

| read-tie | R1, IB1 | (A1) |
| read-tie | R2, IB2 | (A2) |
| add | R3, R2, R1 | (A3) |

In the pseudo-code above, read-tie instruction (A1) associates a register address (R1) with memory address (IB1) of an input buffer. Read-tie instruction (A2) associates a register address (R2) with a memory address (IB2) of an input buffer 2. In a conventional RISC processor, add instructions (A3) would add the values stored in registers R1 and R2 and store the resulting value in register R3. However, when executed by a processor according to the present invention, add instruction (A3) causes the processor to add the values of input buffer IB1 and input buffer IB2 and store this resulting value in register R3. This is because register address R1 is associated with memory address IB1 of input buffer 1 and register address R2 is associated with memory address IB2 of input buffer 2. Associating register addresses R1 and R2 with memory addresses IB1 and IB2 of input buffer 1 and input buffer 2 eliminates the need for instructions to load data directly from the input buffers into registers R1 and R2 prior to executing the add instruction (A3). It is to be appreciated that in an embodiment, prior to associating register addresses with memory addresses of input buffers, a memory transaction detailing the number of elements to be accessed from each buffer is executed. The memory transaction may also include the starting memory address of the input buffer, the data width of each transaction, the stride of each transaction etc.

As illustrated by the above example pseudo-code, using read-tie instructions to set up a program code that operates on streaming data from a buffer will reduce the number of instructions needed in the body of the loop and reduce the time required to provide the operands needed to execute add instruction (A3). Because register addresses R1 and R2 have been tied to memory addresses IB1 and IB2 with instructions (A1) and (A2), add instruction (A3) or any other instruction that needs data from input buffer 1 and/or input buffer 2 can do so by using associated register addresses R1 and R2, without having to use load instructions to first load data from input buffers 1 and input buffer 2 into register R1 or R2. Additionally, as illustrated by the above program code, it is a feature of the present invention that there is no need, for example, for new arithmetic instructions that access data directly from memory locations such as input buffers. Thus the industry standard RISC architecture instructions can continue to be used while data mover engine 232 routes data from associated memory locations in the background.

Now consider the following example pseudo-code which is written using a single write-tie instructions 630 shown in FIG. 6C. This example pseudo-code is assumed to be executed following execution of instructions (A1), (A2), and (A3) above.

|  | single write-tie | R4, OB1 | (A4) |
|---|---|---|---|
|  | add | R4, R2, R1 | (A5) |

Single write-tie instruction (A4) associates register address R4 with output buffer 1. If executed by a conventional RISC processor, add instruction (A5) would add the values stored in registers R1 and R2 and store the resulting value in register R4. However, when executed by a processor according to the present invention, add instruction (A5) adds the values stored in input buffer 1 and input buffer 2 and stores the resulting value in output buffer 1 (OB1). By using the read-tie instructions above and the single write-tie instruction (A4) before add instruction (A5), the present invention has eliminated a need for several load and store instructions that would be required to perform the same tasks if they were performed using a conventional RISC processor.

As described herein, if single write-tie instruction (A5) were to be replaced by a dual write-tie instruction 640 (shown in FIG. 6D), the resulting value of add instruction (A5) would be written to both register R4 and output buffer 1.

Finally, consider the example pseudo-code below, which illustrates how the present invention can be used to implement a processing loop. It should be understood that the following example pseudo-code is not intended to limit the present invention. For example, although the following pseudo-code does not explicitly account for a branch delay slot, the pseudo-code can be modified and implemented using a processor that has a delayed branch.

|  | read-tie | R1, IB1 | (B1) |
|---|---|---|---|
|  | dual write-tie | R2, OB1 | (B2) |
| Loop | add | R2, R2, R1 | (B3) |
|  | BGTZ | R1, Loop | (B4) |
|  | untie | R2, OB1 | (B5) |
|  | untie | R1, IB1 | (B6) |

As described herein, when executed using a processor according to the present invention, the above example pseudo-code works as follows. Read-tie instruction (B1) cause a data mover engine of the processor to form an association between input buffer 1 (IB1) and register R1 of the processor. The number of elements to be accessed from input buffer 1 is stored in a counter associated with the buffer when the memory transaction for input buffer 1 is executed. For example, the memory transaction may be set up to access 20 data elements from input buffer 1. Dual write-tie instruction (B2) causes the data mover engine to form an association between output buffer 1 (OB1) and register R2 of the processor. Add instruction (B3) causes the processor to add a data element from input buffer 1 to the value stored in register R2 and write the resulting value both to register R2 and output buffer 1. BGTZ instruction (B4) and add instruction (B3) form a loop. When executed, BGTZ instruction (B4) is resolved by the data mover engine of the processor. The data mover engine will signal to the execution unit of the processor that the branch to add instruction (B3) is taken until all the data elements in input buffer 1 have been processed. After all data elements from input buffer 1 have been processed, the branch is not taken. Untie instructions (B5) and (B6) cause the data mover engine to dissolve the associations created between input buffer 1 and register R1 and between output buffer 1 and register R2.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Such software can be disposed in any known computer usable medium including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

What is claimed is:

1. A processing system, comprising:
a buffer;
a hardware processor that includes
an execution unit;
a plurality of software accessible registers; and
a data moving engine coupled to the execution unit, the software accessible registers, and the buffer, wherein execution of a first instruction associates a memory address of the buffer with one of the software accessible registers, and thereafter the data moving engine resolves a conditional branch instruction, which specifies the one of the software accessible registers, by testing a value corresponding to a number of elements to be accessed from the buffer, wherein the value is stored in a location which is determined based on the memory address of the buffer, wherein the location is not part of the buffer.

2. The processing system of claim 1, wherein the first instruction is a read-tie instruction.

3. The processing system of claim 1, wherein the memory address of the buffer is associated with a register address of the one of the software accessible registers as a result of writing a value to a co-processor register.

4. The processing system of claim 1, wherein a memory transaction determines the number of elements to be accessed from the buffer.

5. The processing system of claim 1, wherein the data moving engine includes a binding table that maintains at least one association between the memory address of the buffer and a register address of the one of the software accessible registers.

6. The processing system of claim 1, wherein the one of the software accessible registers is one of a general purpose register, an accumulation register, a floating point unit register, and a co-processor register.

7. The processing system of claim 1, wherein the buffer is a stream buffer.

8. The processing system of claim 1, wherein the location corresponds to a counter register.

9. A hardware processor, comprising:
an execution unit;
a plurality of software accessible registers coupled to the execution unit; and
a data moving engine coupled to the execution unit and the software accessible registers;
wherein execution of a first instruction associates a memory address of a buffer coupled to the hardware processor with one of the software accessible registers, and thereafter the data moving engine resolves a conditional branch instruction, which specifies the one of the software accessible registers, by testing a value corresponding to a number of elements to be accessed from the buffer, wherein the value is stored in a location which is determined based on the memory address of the buffer, wherein the location is not part of the buffer.

10. The hardware processor of claim 9, wherein the first instruction is a read-tie instruction.

11. The hardware processor of claim 9, wherein the memory address of the buffer is associated with a register address of the one of the software accessible registers as a result of writing a value to a co-processor register.

12. The hardware processor of claim 9, wherein the data moving engine includes a binding table that maintains at least one association between the memory address of the buffer and a register address of the one of the software accessible registers.

13. The hardware processor of claim 9, wherein the one of the software accessible registers is one of a general purpose register, an accumulation register, a floating point unit register, and a co-processor register.

14. The hardware processor of claim 9, wherein the location corresponds to a counter register.

15. A computer program product comprising a non-transitory computer readable storage medium, the computer readable storage medium having embodied thereon computer readable program code for generating a processor core, the computer readable program code comprising:
first computer readable program code for generating an execution unit;
second computer readable program code for generating a plurality of software accessible registers; and
third computer readable program code for generating a data moving engine coupled to the execution unit and the software accessible registers;
wherein execution of a first instruction associates a memory address of a buffer coupled to the processor core with one of the software accessible registers, and thereafter the data moving engine resolves a conditional branch instruction, which specifies the one of the software accessible registers, by testing a value corresponding to a number of elements to be accessed from the buffer, wherein the value is stored in a location which is determined based on the memory address of the buffer, wherein the location is not part of the buffer.

16. The computer program product of claim 15, wherein the first instruction is a read-tie instruction.

17. The computer program product of claim 15, wherein the memory address of the buffer is associated with a register address of the one of the software accessible registers as a result of writing a value to a co-processor register.

18. The computer program product of claim 15, wherein the data moving engine includes a binding table that maintains at least one association between the memory address of the buffer and a register address of the one of the software accessible registers.

19. The computer program product of claim 15, wherein the one of the software accessible registers is one of a general purpose register, an accumulation register, a floating point unit register, and a co-processor register.

20. The computer program product of claim 15, wherein the processor core is embodied in hardware description language software.

21. The computer program product of claim 15, wherein the processor core is embodied in one of Verilog hardware description language software and VHDL hardware description language software.

22. The computer program product of claim 15, wherein the location corresponds to a counter register.

23. A method for resolving a conditional branch in a processing system, the processing system including a buffer and a processor that has a data moving engine, an execution unit, and a plurality of software accessible registers, the method comprising:
(1) associating a memory address of the buffer with a register address of a first software accessible register upon executing an instruction;
(2) decoding a conditional branch instruction that specifies the first software accessible register; and
(3) in response to executing the conditional branch instruction, testing a value corresponding to a number of elements to be accessed from the buffer, wherein the value is stored in a location which is determined based on the memory address of the buffer, wherein the location is not part of the buffer, to resolve the conditional branch instruction.

24. The method of claim 23, wherein step (1) comprises executing an instruction that associates the memory address of the buffer with a register address of one of a general purpose register, an accumulation register, a floating point unit register, and a co-processor register.

25. The method of claim 24, wherein step (1) comprises executing a read-tie instruction.

26. The method of claim 23, wherein the location corresponds to a counter register.

* * * * *